May 29, 1956  M. WINTER  2,747,546
FEED DISPENSING SILO
Filed April 12, 1955  2 Sheets-Sheet 2

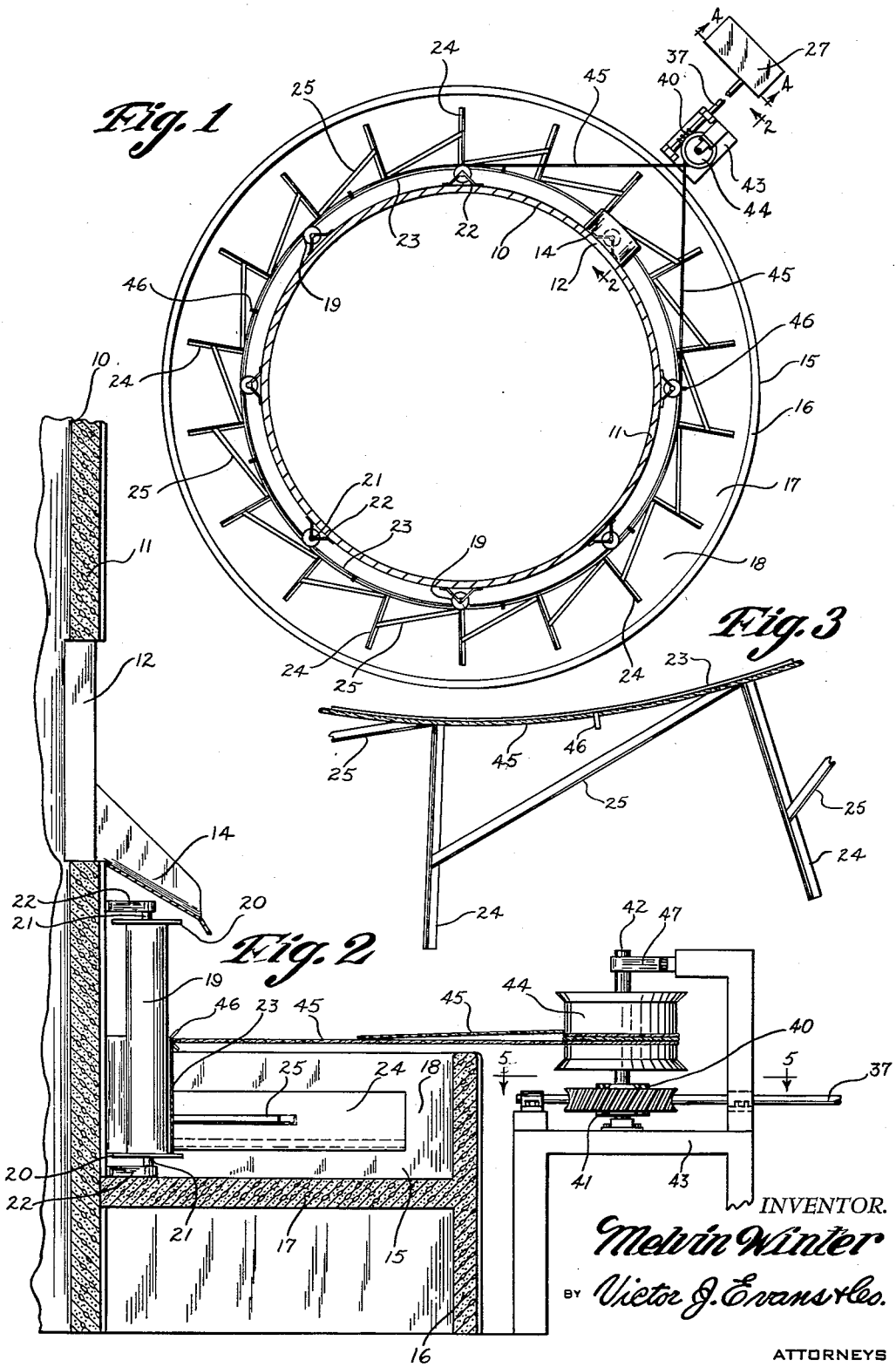

INVENTOR.
Melvin Winter
BY Victor J. Evans & Co.

ATTORNEYS

United States Patent Office 2,747,546
Patented May 29, 1956

2,747,546

FEED DISPENSING SILO

Melvin Winter, Russell, Minn.

Application April 12, 1955, Serial No. 500,836

3 Claims. (Cl. 119—52)

This invention relates to a silo, and more particularly to a feeder device for a silo.

The object of the invention is to provide a feeder device which is adapted to rotate around a silo so as to conveniently distribute feed for a plurality of cattle or the like.

Another object of the invention is to provide a feeder device for a silo which includes a bunker that defines therein a trough, there being a plurality of paddles which are adapted to slowly move through the trough so as to distribute the feed which comes from the silo evenly throughout the trough whereby a plurality of animals will be readily and conveniently able to eat the feed.

A further object of the invention is to provide a silo feeding device which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a horizontal sectional view taken through the silo and showing the feeder device of the present invention.

Figure 2 is an enlarged sectional view taken on the line 2—2 of Figure 1.

Figure 3 is an enlarged fragmentary sectional view illustrating the paddles.

Figure 4:
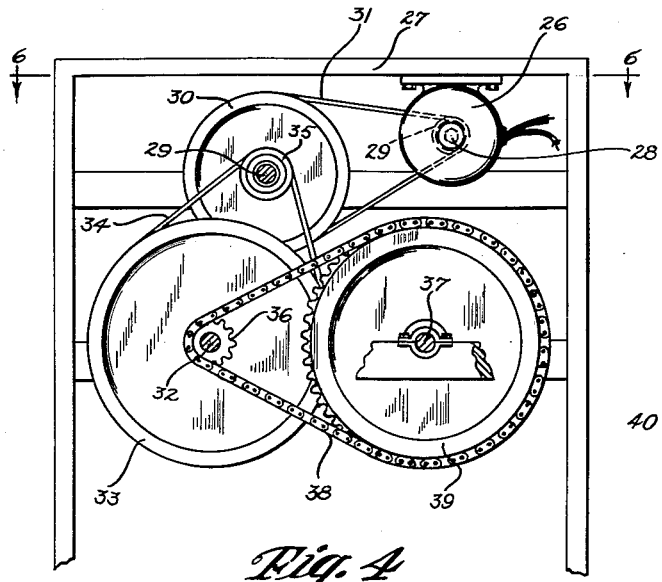
Figure 4 is an enlarged sectional view taken on the line 4—4 of Figure 1.

Referring in detail to the drawings, the numeral 10 designates a silo which is adapted to hold a suitable quantity of feed, and the silo 10 includes an outer cylindrical wall 11, the silo 10 being stationary. The wall 11 is provided with an opening 12 whereby the feed can be moved outwardly from the silo through the opening 12 in any suitable manner. An inclined spout 14 extends outwardly from the wall 11 below the opening 12, and the spout 14 is adapted to guide the feed stuff into a trough 18 which is defined in a bunker 15.

The bunker 15 includes an outer stationary wall of circular shape, and this wall is indicated by the numeral 16, Figure 2. A horizontally disposed wall or platform 17 extends between the walls 16 and 11 and is secured thereto.

Arranged in spaced parallel relation around the outer surface of the wall 11 of the silo 10 is a plurality of rollers 19 which have annular flanges 20 on their ends. Trunnions 21 extend from the ends of the rollers 19, and the trunnions 21 are journaled in brackets 22 which may be secured to the wall 11. A circular rim 23 is arranged in engagement with the rollers 19, and the rim 23 rotates around the silo 10. Extending outwardly from the rim 23 and secured thereto is a plurality of spaced apart paddles 24, and the paddles 24 extend into the trough 18 so as to evenly distribute the feed throughout the trough 18. Braces 25 extend between the paddles 24.

There is further provided a means for rotating the rim 23 and paddles 24, and this means comprises a motor 26 which can be secured within a base or support structure 27, and the motor 26 may be driven in any suitable manner, as for example the motor 26 may be connected to a suitable source of electrical energy. A drive shaft 28 is operated by the motor 26, and a small pulley 29 is mounted on the shaft 28, there being an endless belt 31 arranged in engagement with the pulley 29, Figure 4. A first shaft member 29 is journaled or supported by the base 27, and a pulley 30 is mounted on the shaft member 29, the belt 31 being trained over the pulley 30. A second shaft member 32 is spaced from the shaft member 29, and a pulley 33 is mounted on the shaft member 32, there being an endless belt 34 trained over the pulley 33 and over a pulley 35 which is mounted on the shaft member 29. A sprocket 36 is mounted on the shaft member 32, and an endless chain 38 is trained over the sprocket 36 and over a sprocket wheel 39 which is mounted on a shaft member 37. The shaft member 37 has a worm 40 thereon, Figure 5, and the worm 40 meshes with a worm wheel 41 which is mounted on a driven shaft 42, and the driven shaft 42 may be supported by a housing or support 43, Figures 5 and 2.

Mounted on the driven shaft 42 is a drum 44, and a cable 45 is trained over or arranged in engagement with the drum 44, the cable 45 also being trained around the rim 23. Fingers 46 are provided for guiding the cable 45 so as to maintain the cable 45 in its proper position on the rim 23. A bracket 47 may be provided for helping to support the driven shaft 42.

From the foregoing it is apparent that there has been provided a feeding device for use with a silo such as the silo 10. In use the feeding device may be mounted around the outside of the silo and the feed from the silo 10 is passed out through the opening 12 in any desired manner. This feed is then guided by the spout 14 into the trough 18 which is defined by the walls 17 and 16, Figure 2. The motor 26 is actuated to drive the shaft 28 and this moves the belt 31 which rotates the pulley 30 and this drives the shaft 29. As the shaft 29 rotates, the belt 34 will move to rotate the shaft 32 which in turn rotates the shaft 37 through the sprocket and chain mechanism shown in Figure 4. As the shaft 37 rotates, the worm 40 will rotate and this causes rotation of the worm gear 41 which rotates the driven shaft 42. The driven shaft 42 has the drum 44 mounted thereon and since the cable 45 is trained over the drum 44 and over the rim 23, then the rim 23 will be rotated around the silo 10. As the rim 23 rotates the plurality of paddles 24 will move through the trough so that the feed issuing from the spout 14 will be evenly distributed throughout the trough whereby a plurality of animals can readily and conveniently eat the feed from the trough.

Figure 5:
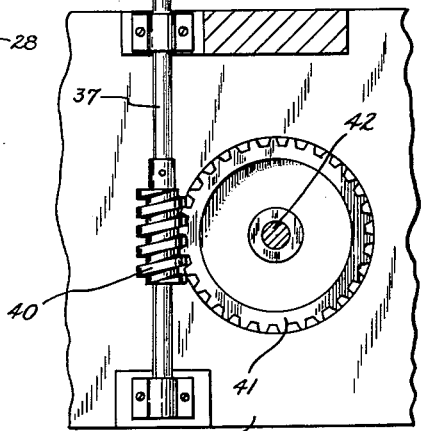
Figure 5 is a sectional view taken on the line 5—5 of Figure 2.
Figure 7:
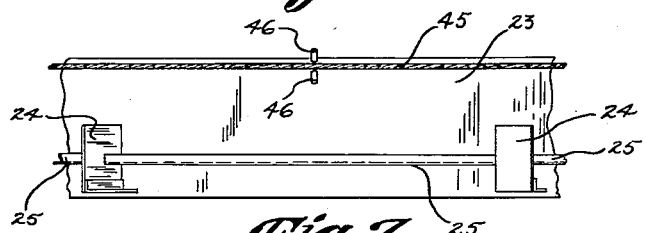
Figure 7 is a fragmentary elevational view illustrating the rim and paddles.
Figure 8:
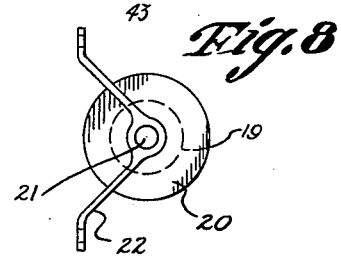
Figure 8 is an elevational view illustrating one of the rollers and its mounting bracket.
Figure 6:
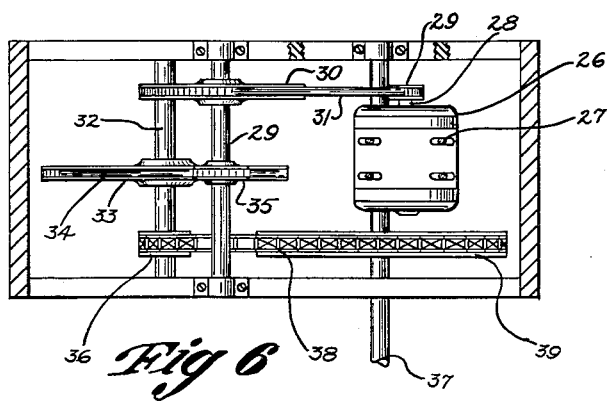
Figure 6 is a sectional view taken on the line 6—6 of Figure 4.
Figure 9:
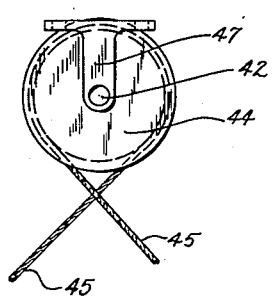
Figure 9 is an end elevational view illustrating the drum and its mounting bracket.

The paddles 24 move very slowly due to the reduction gearing arrangement shown in Figures 4 and 6 so that there will be no inconvenience to the cattle as the paddles 24 move through the trough 18. The rollers 19 help eliminate or minimize friction as the rim 23 travels around the silo.

The feeder device of the present invention can be mounted on various types of silos. The rollers 19 maintain the rim in its proper position. Instead of using the motor 26, other conventional power sources (not shown) can be used, as for example a tractor power take-off, a hand crank, or the like. The bunker 15 can be made of any suitable material and of any desired size. As an example of the speed of rotation of the rim, the gearing may be such as to cause the rim to make one revolution every 15 minutes. With the present invention the task of getting the feed to the cattle or the silage to the cattle is greatly simplified.

I claim:

1. In combination, a stationary cylindrical silo adapted to hold a quantity of feed, silage and the like, said silo including a cylindrical outer wall provided with an opening, a bunker arranged around said silo and including a vertically disposed wall and a horizontally disposed bottom wall defining a feed trough for receiving material from the opening in said silo, a plurality of vertically disposed spaced parallel rollers journaled around the outside of said silo and including circular flanges on their ends, a rotary circular rim arranged in engagement with said rollers, a plurality of paddles extending outwardly from said rim and secured thereto, said paddles projecting into said feed trough, braces extending between said paddles, means for rotating said rim and paddles, said means comprising a base spaced outwardly of said bunker, a motor mounted on said base and adapted to be connected to a source of electrical energy, a drive shaft operated by said motor, a driven shaft spaced from said drive shaft, drive means connecting said driven shaft to said drive shaft, a drum on said driven shaft, a cable trained over said drum and said rim, said drive means comprising a first shaft member spaced from said drive shaft, a first pulley on said first shaft member, a second shaft member spaced from said first shaft member and having a second pulley thereon, an endless belt trained over said pulleys, a sprocket on said second shaft member, a sprocket wheel spaced from said sprocket, an endless chain trained over said sprockets, a shaft member driven by said sprocket wheel, a worm on said last named shaft member, and a worm gear meshing with said worm and connected to said driven shaft.

2. The structure as defined in claim 1, and further including guide fingers extending outwardly from said rim for engagement with said cable.

3. In combination, a stationary silo adapted to hold a quantity of feed, silage and the like, said silo including an outer wall provided with an opening, a bunker arranged around said silo and including a vertically disposed wall and a bottom wall defining a feed trough for receiving material from the opening in said silo, a plurality of rollers journaled around the outside of said silo and including circular flanges on their ends, a rotary rim arranged in engagement with said rollers, a plurality of paddles extending outwardly from said rim and secured thereto, said paddles projecting into said feed trough, means for rotating said rim and paddles, said means comprising a motor adapted to be connected to a source of electrical energy, a drive shaft operated by said motor, a driven shaft spaced from said drive shaft, drive means connecting said driven shaft to said drive shaft, a drum on said driven shaft, a cable trained over said drum and said rim, said drive means comprising a first shaft member spaced from said drive shaft, a first pulley on said first shaft member, a second shaft member spaced from said first shaft member and having a second pulley thereon, an endless belt trained over said pulleys, a sprocket on said second shaft member, a sprocket wheel spaced from said sprocket, an endless chain trained over said sprockets, a shaft member driven by said sprocket wheel, and gear means connecting said shaft member to said driven shaft.

References Cited in the file of this patent

UNITED STATES PATENTS

| 852,885 | Lloyd et al. | May 7, 1907 |
| 2,652,808 | Wagner | Sept. 22, 1953 |
| 2,709,987 | Bubenzer | June 7, 1955 |

FOREIGN PATENTS

| 916,038 | Germany | Aug. 2, 1954 |

OTHER REFERENCES

Country Gentleman, February 1954, pages 40 and 41.